United States Patent [19]

McGrail et al.

[11] Patent Number: 5,434,224
[45] Date of Patent: Jul. 18, 1995

[54] THERMOSET AND POLYARYLSULFONE RESIN SYSTEM THAT FORMS AN INTERPENETRATING NETWORK

[75] Inventors: Patrick T. McGrail, Saltburn; Mark S. Sefton, Northallerton; Judith A. Peacock, Middlesbrough, all of England; Gregory R. Almen, Mesa, Ariz.; Steven P. Wilkinson, Keighley, England

[73] Assignee: Imperial Chemical Industries PLC, London, United Kingdom

[21] Appl. No.: 27,999

[22] Filed: Mar. 8, 1993

Related U.S. Application Data

[60] Division of Ser. No. 768,113, Sep. 30, 1991, Pat. No. 5,231,150, which is a continuation of Ser. No. 253,596, Oct. 5, 1988, abandoned.

[30] Foreign Application Priority Data

Oct. 5, 1987 [GB] United Kingdom .............. 52-872291

[51] Int. Cl.$^6$ .............................................. C08G 8/28
[52] U.S. Cl. ................................... 525/503; 525/395; 525/396; 525/454; 525/504; 525/505; 525/507; 525/513; 525/534; 525/535; 525/903; 525/906; 525/929

[58] Field of Search ............... 525/503, 505, 395, 396, 525/535, 906, 903, 504, 454, 507, 513, 929, 534

[56] References Cited

U.S. PATENT DOCUMENTS

| | | | |
|---|---|---|---|
| 3,912,566 | 10/1975 | Andrews et al. | 525/528 |
| 4,496,695 | 1/1985 | Sugio et al. | 525/395 |
| 4,661,559 | 4/1987 | Gardner et al. | 525/906 |
| 4,663,401 | 5/1987 | Saito et al. | 525/906 |
| 4,822,832 | 4/1989 | Chu et al. | 525/906 |

*Primary Examiner*—Melvyn I. Marquis
*Assistant Examiner*—Randy Gulakowski

[57] ABSTRACT

A polymer composition especially suitable for producing fiber-reinforced structures having advantageous fracture toughness comprises a polyarylsulphone component and a thermoset resin component, each of which components is present at least partly as a phase continuous in at least one dimension. Preferred polyarylsulphones contain repeating units $(PhSO_2Ph)_n$ and $(Ph)_a$ linked through ether and/or thioether, where Ph is phenylene, $n=1$ to 2 and $a=1$ to 3; and such polyarylsulphones having amino end groups are provided as new compounds. The compositions can be made by spinodal decomposition of a mixture of the polyarylsulphone and a thermoset resin precursor.

22 Claims, 4 Drawing Sheets

THERMOSET AND POLYARYLSULFONE RESIN SYSTEM THAT FORMS AN INTERPENETRATING NETWORK

This is a divisional of application Ser. No. 07/768,113 filed on Sep. 30, 1991 now U.S. Pat. No. 5,231,150, which is a continuation of application Ser. No. 07/253,596 filed on Oct. 5, 1988, now abandoned.

This invention relates to a polymer composition comprising a thermoplast and a thermoset.

It has been proposed to modify thermoset polymers by incorporating aromatic sulphone polymer thermoplasts with them, for example in U.S. Pat. No. 3,530,087, U.S. Pat. No. 4,661,559, U.S. Pat. No. 4,663,401 and EP-A-193082. The state in which the components exist as such compositions is not generally disclosed in detail, but in EP-A-193082 is stated to be characterised by domains of thermoset resin in a continuous thermoplast phase.

We have now produced a composition in which a thermoplast polymer and a thermoset polymer are combined together in distinct morphology that results in advantageous properties such as flexural modulus, compressive yield stress and fracture toughness. We have also identified a new thermoplast polymer especially suitable as a component of our composition and a method of bringing together a thermoplast and a thermoset polymer.

According to the invention a polymer composition comprises a polyarylsulphone component and a thermoset resin component and is characterised in that each of such components is present at least partly as a phase elongated in at least one dimension.

The term "component" signifies that each phase is rich respectively in polyarylsulphone or thermoset resin but need not consist thereof.

Accompanying FIG. 1 shows examples of the morphology of certain thermoplast/thermoset compositions in the cured state. In FIGS. 1(a) and 1(b) which do not represent the invention, the thermoset resin component is dispersed in respectively small and large units ("islands") throughout a continuous phase ("sea") of thermoplast component or vice versa. In FIG. 1(c) which also does not represent the invention, the two components are respectively so finely dispersed as to produce an effectively homogeneous mixture. In FIG. 1(d), according to the invention, the components are combined in a network in which each extends continuously through any mass of the composition. On a microscopic scale, one phase is believed to be in the form of a net in 2 or 3 dimensions, and the second phase fills the interstices between the threads of the net. It appears that the first phase is anisotropic on a microscopic scale; the second phase can be isotropic or anisotropic.

The minimum dimension of each phase is typically at least 0.005, for example in the range 0.01 to 10, especially up to 5, microns. The maximum dimension of each phase is considerably greater for example L/D at least 10, and may be at least 10% of the geometric dimension of a mass of the composition. The two said phases can be the product of spinodal decomposition (described further below) of an initially substantially homogeneous liquid mixture containing the polyarylsulphone and the uncured or incompletely cured thermoset resin component.

In preferred forms, as will be described, the composition is characterised by chemical bonds bridging the interface between the two phases. As a result of the fineness of the mutual dispersion of the two phases, the solubility or swellability of the thermoplast is substantially less than if the thermoset resin were not present. This is so even if the thermoplast is of molecular weight over 10000 or if it is halogen-ended, so that insolubilisation by reaction of end-groups with thermoset precursor is limited, if present at all, but is more pronounced when the thermoplast carries thermoset-reactive groups, as will be described.

The morphology of the composition is evident in solid structures formed from the composition. The invention includes also precursor compositions (detailed below) which are flowable or plastic and are convertible to such a solid composition by solvent removal and at least partial curing; in such a flowable or plastic composition the specified morphology may be evident, but more usually shows only after solvent removal and/or curing.

The polyarylsulphone thermoplast polymer chain contains the repeating units $(PhSO_2Ph)_n$ linked through ether and/or thioether, where $n=1$ to 2 and can be fractional. It preferably contains also units $(Ph)_a$ so linked, where Ph is phenylene (especially paraphenylene), a is 1 to 3 and can be fractional and such phenylenes are linked linearly through a single chemical bond or a divalent group other than $SO_2$ or are fused together. By "fractional" reference is made to the average value for a given polymer chain containing units having various values of n or a.

The invention provides further a polymer composition comprising a polyarylsulphone component and a thermoset component, in the polyarylsulphone of which the relative proportions of the said repeating units is such that on average at least two units $(PhSO_2Ph)_n$ are in immediate mutual succession in each polymer chain present and is preferably in the range 1:99 to 99:1, especially 10:90 to 90:10, respectively. Typically the ratio is in the range 25–50 $(Ph)_a$, balance $(Ph\ SO_2\ Ph)_n$. In preferred polyarylsulphones the units are

I X Ph $SO_2$ Ph X Ph $SO_2$ Ph ("PES"); and

II X $(Ph)_a$ X Ph $SO_2$ Ph ("PEES")

where X is O or S and may differ from unit to unit; the ratio of I to II (respectively) preferably between 10:90 and 80:20 especially between 10:90 and 55:45.

The preferred relative proportions of the repeating units of the polyarylsulphone may be expressed in terms of the weight percent $SO_2$ content, defined as 100 times (weight of $SO_2$)/(weight of average repeat unit). The preferred $SO_2$ content is at least 22, preferably 23 to 25%. When $a=1$ this corresponds to PES/PEES ratios of at least 20:80, preferably in the range 35:65 to 65:35.

The above proportions refer only to the units mentioned. In addition to such units the polyarylsulphone may contain up to 50 especially up to 25% molar of other repeating units: the preferred $SO_2$ content ranges (if used) then apply to the whole polymer. Such units may be for example of the formula in which A is a direct link, oxygen, sulphur, —CO— or a divalent hydrocarbon radical. When the polyarylsulphone is the product of nucleophilic synthesis, its units may have been derived for example from one or more the following bisphenols and/or corresponding bis-thiols or phenol-thiols:

hydroquinone
4,4'-dihydroxybiphenyl
resorcinol
dihydroxynaphthalene (2,6 and other isomers)
4,4'-dihydroxydiphenyl ether or -thioether
4,4'-dihydroxybenzophenone
2,2'-di-(4-hydroxyphenyl)-propane or -methane.

If a bis-thiol is used, it may be formed in situ, that is, a dihalide as described for example below may be reacted with an alkali sulphide or polysulphide or thiosulphate.

Other examples of such additional units are of the formula in which Q and Q', which may be the same or different, are CO or $SO_2$; Ar is a divalent aromatic radical; and n is 0, 1, 2, or 3, provided that n is not zero where Q is $SO_2$. Ar is preferably at least one divalent aromatic radical selected from phenylene, biphenylene or terphenylene. Particular units have the formula where m is 1, 2 or 3. When the polymer is the product of nucleophilic synthesis, such units may have been derived from one or more dihalides, for example:

4,4'-dihalobenzophenone
4,4' bis-(4-chlorophenylsulphonyl)biphenyl
1,4bis-(4-halobenzoyl)benzene
4,4'-bis-(4-halobenzoyl)biphenyl They may of course have been derived partly from the corresponding bisphenols.

The polyarylsulphone may be the product of nucleophilic synthesis from halophenols and/or halothiophenols. In any nucleophilic synthesis the halogen if chlorine or bromine may be activated by the presence of a copper catalyst. Such activation is often unnecessary if the halogen is activated by an electron withdrawing group. In any event fluoride is usually more active than chloride. Any nucleophilic synthesis of the polyarylsulphone is carried out preferably in presence of one or more alkali metal carbonates in up to 10% molar excess over the stoichiometric and of an aromatic sulphone solvent, at a temperature in the range 150°-350° C.

If desired, the polyarylsulphone may be the product of electrophilic synthesis.

The polyarylsulphone preferably contains end groups and/or pendant groups of formula —A'—Y where A' is a divalent hydrocarbon group, preferably aromatic, and Y is a group reactive with epoxide groups or with a curing agent or with like groups on other polymer molecules. Examples of Y are groups providing active hydrogen especially OH, $NH_2$, NHR or —SH, where R is a hydrocarbon group containing up to 8 carbon atoms, or providing other cross-linking reactivity especially epoxy, cyanate, isocyanate, acetylene or ethylene, as in vinyl, allyl or maleimide.

The number average molecular weight of the polyarylsulphone is suitably in the range 2000 to 60000. Preferably it is over 9000 especially over 10000 for example 11000 to 25000 and structurally as well as by chemical interaction increases toughness by comparison with that of the thermoset resin alone by providing zones of the tough thermoplast between cross-linked thermoset zones. Another useful sub-range is 3000-11000, especially 3000-9000 in which it acts more as a chain-extender for the thermoset resin, separating and diluting local cross-link zones and thus toughening the structure. Within the above definition of the polyarylsulphone those are preferably chosen which are miscible with suitable epoxy resin precursors, have high modulus and Tg and are tough.

It is convenient to use reduced viscosity (RV), measured on a solution of 1 g of polymer in 100 ml of solution in dimethyl formamide at 25° C. as an indication of molecular weight, the correlation being as follows:

| RV | 0.15 | 0.25 | 0.45 | 0.92 |
|---|---|---|---|---|
| MW (number average) | 5000 | 13000 | 20000 | 60000 |

(Such molecular weights were in fact measured by vapour phase osmometry and are of course subject to the usual error range of about 10%).

A polyarylsulphone of molecular weight at least 9000 containing the units $(PhSO_2Ph)_n$ and $(Ph)_a$ in the proportions defined above, with possibly one or more of the said additional units in the proportions defined above, all linked through ether and/or thioether and in which at least 30% of its end groups are $NH_2$, is new and constitutes a second aspect of the invention.

This second aspect of the invention provides also a process for preparing such a polyarylsulphone by reacting at a temperature in the range 150°-350° C. the corresponding halogen-ended polymer with a compound containing an aromatic amine group and an aromatic hydroxy and/or thiol group in the presence of a base, preferably one or more alkali metal carbonates, and of an aromatic sulphone solvent. It provides also the total process including preparation of such a halogen-ended polymer from nucleophilic reactant as detailed herein.

The weight proportion of thermoplast component in the composition is typically in the range 5-90%, especially 20-50, for example 25-40%. These percentages represent non-volatile constituents after curing the thermoset resin at up to 200° C.

In this specification the term "thermoset resin" will signify that such resin is in such a state, for example has been at least partly cured, as to establish the morphology which the polymer blend will exhibit after curing. The degree of cure may be sufficiently incomplete to permit some flowability or plasticity, thus permitting fabrication in conditions not destructive of the morphology, followed by final cure to give a solid article. In some compositions according to the invention the specified morphology may be established only at high degrees of cure. However, a thermosettable component such as a diglycidyl reactant, which is often referred to as a "resin", will be herein referred to as a "resin precursor".

A wide range of thermoset resins can be toughened by incorporation with the polyarylsulphone. Among those to which the invention is applicable are:

addition-polymerisation resins such as acrylics, vinyls, bis-maleimides (BMI) and unsaturated polyesters;
formaldehyde condensate resins such as with urea, melamine or phenols
cyanate resins
isocyanate resins
functionalised polyesters, polyamides or polyimides
epoxy resins and mixtures of two or more of these.

The epoxy resin is suitably the product of at least partly curing a resin precursor using a curing agent and possibly also a catalyst. The resin precursor is typically the mono or poly-glycidyl derivative of one or more of:

aromatic diamines
aromatic monoprimary amines
aminophenols
polyhydric phenols
polyhydric alcohols
polycarboxylic acids.

Examples are the following, which are liquids at ambient temperature:.

tetraglycidyl diamino diphenylmethane eg "MY 720" or "MY 721" sold by Ciba-Geigy, viscosity 10–20 Pa s at 50° C.; (MY 721 is a lower viscosity version of MY720 and is designed for higher use temperatures).
triglycidyl derivative of p-aminophenol (eg "MY 0510" sold by Ciba-Geigy), viscosity 0.55–0.85 Pa s at 25° C.; preferably this constitutes at least 25% of the epoxy components used;
diglycidyl ether of 2,2-bis(4,4'-dihydroxy phenyl) propane (eg "Epikote 828" sold by Shell), preferably of viscosity 8–20 Pa s at 25° C.;
epoxy Novolak (eg "DEN 431" sold by Dow), varieties in the low viscosity class of which are preferred in making compositions according to the invention;
Bisphenol F, which is in the low viscosity class;

Other epoxy resin precursors includes cycloaliphatics such as 3',4'-epoxycyclohexyl-3,4-epoxycyclohexane carboxylate (eg CY 179 sold by Ciba-Geigy) and those in the "Bakelite" range of Union Carbide Corporation.

The curing agent is preferably an amino compound having a molecular weight up to 500 per amino group, for example an aromatic amine or a guanidine derivative. Particular examples are 3,3'- and 4,4'-diaminodiphenylsulphone, methylenedianiline and dicyandiamide. Such amine curing agents are additional to the amine-ended thermoplast:

thus the composition preferably contains epoxy-reactive amines of two types, one having a molecular weight up to 500 per amine group, the other having a molecular weight of at least 5000 per amine group and the total amine content being in the range 70–110% of the stoichiometric requirement of the epoxy resin precursor. Other standard epoxy curing agents such as aliphatic diamines, amides, carboxylic acid anhydrides, carboxylic acids and phenols can be used if desired.

If a catalyst is used, it is typically a Lewis acid, for example boron trifluoride, conveniently as a derivative with an amine such as piperidine or methyl ethylamine. Alternatively it can be basic, for example an imidazole or amine.

We find it advantageous to choose a low viscosity epoxy resin precursor (under 100, for example 0.3–50 Pa s at 25° C.) for at least part of the thermoset resin precursor. There may also be present a proportion of high viscosity (over 100 Pa s at 25° C.) epoxy resin precursor. By keeping the viscosity low or moderately low it becomes easier to ensure that the thermoplast is in solution, to ensure good flow behaviour when pre-pregging continuous fibre and to endow prepregs with tack and drape properties.

If the thermoset resin component is a BMI resin, it is derived suitably from a precursor of general formula where m is 1 to 4 and A is as defined hereinbefore and the As differ when m exceeds 1.

The composition is particularly suitable for fabrication of structures, including load-bearing or impact resisting structures. For this purpose it may contain a reinforcing agent such as fibres. Fibers can be added short or chopped typically of mean fibre length not more than 2 cm, for example about 6 mm, typically at a concentration of 5 to 35, preferably at least 20%, by weight. For structural applications, it is preferred to use continuous fibre for example glass or carbon, especially at 30 to 70, more especially 50 to 70, % by volume.

The fibre can be organic, especially of stiff polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition according to the invention. In particular carbon or graphite fibres that are unsized or are sized with epoxy resin precursor or thermoplast such as polyarylsulphone are preferred. Inorganic fibre preferably is sized with a material that bonds both to the fibre and to the polymer composition; examples are the organo-silane coupling agents applied to glass fibre.

The composition may contain for example conventional toughening agents such as liquid rubbers having reactive groups, aggregates such as glass beads, rubber particles and rubber-coated glass beads, fillers such as polytetrafluoroethylene, graphite, boron nitride, mica, talc and vermiculite, pigments, nucleating agents, and stabilisers such as phosphates. The total of such materials and any fibrous reinforcing agent should be such that the composition contains at least 20% by volume of the polysulphone/thermoset mixture. The percentages of fibres and such other materials are calculated on the total composition after curing at up to 200° C.

In a third aspect the invention provides a process for making a thermosettable composition by the steps of:

(a) making a blend comprising at least one amorphous polymer, at least one thermoset resin precursor and optionally a solvent for one or more of said polymer and resin precursor said components being selected and the conditions of blending being controlled so that the polymer and precursor are present as a substantially homogeneous single phase stable liquid mixture;

(b) rendering said mixture unstable by one or more of these measures:
  (i) adding or (if present) removing solvent;
  (ii) changing temperature;
  (iii) adding fibres and/or particulate filler;
  (iv) causing partial curing of said precursor;

(c) decomposing said mixture spinodally into at least 2 mutually interpenetrating phases; and (d) if required, adding (further) fibres and/or particulate filler.

The resulting composition can have a shelf life long enough for it to be handled in commerce. Step (b) can include (e) forming the mixture into a prepreg by impregnation of continuous fibres;

(f) laying-up said prepreg;

(g) curing the thermoset resin precursor.

The prepreg resulting from step (e) can also have a shelf life long enough to be handled in commerce. The products of step (d) and step (e) constitute further embodiments of the invention.

Herein the products of the various steps are referred to as follows:

step (a): first composition precursor or, if solvent has been removed without spinodal decomposition, concentrated first composition precursor;
step (c): second composition precursor;
step (e): prepreg;
step (g): composition.

If the composition is to be shaped by pre-pregging or lamination, the hardener is added preferably during that operation.

The first composition precursor is made by mixing the polysulphone, thermoset precursor and (at some stage) any fibrous reinforcing agent and other materials. A solvent may be present. The solvent and the proportion thereof are chosen so that the mixture of polymer and resin precursor form at least a stable emulsion, preferably a stable apparently single-phase solution. The ratio of solvent to polysulphone is suitably in the range 5:1 to 20:1 by weight. Preferably a mixture of solvents is used, for example of a halogenated hydrocarbon and an alcohol, in a ratio suitably in the range 99:1 to 85:15. Conveniently the solvents in such a mixture should boil at under 100° C. at 1 atm pressure and should be mutually miscible in the proportions used. Alternatively the polysulphone and thermoset or precursor can be brought together by hot melting and/or high shear mixing.

The mixture is stirred until sufficiently homogeneous. Thereafter any solvent is removed by evaporation to give a concentrated first composition precursor or, if the desired morphology is already present, a second composition precursor. Evaporation is suitably at 50°-200° C. and, at least in its final stages, can be at subatmospheric pressure, for example in the range 0.1 to 10 mm Hg. The concentrated first composition precursor or second composition precursor preferably contains up to 5% w/w of volatile solvent, to assist flow when used to impregnate fibres. This residual solvent is removed in contact with the hot rollers of the impregnating machine.

The concentrated first composition precursor or the second composition precursor, possibly containing some volatile solvent already present or newly added, can be used for example as an adhesive or for coating surfaces or for making solid structures by casting possibly in a foamed state. Short fibre reinforcement may be incorporated with composition precursor. Preferably a fibre-reinforced composition is made by passing essentially continuous fibre into contact with either such precursor composition. The resulting impregnated fibrous reinforcing agent may be used alone or together with other materials, for example a further quantity of the same or a different polymer or resin precursor or mixture, to form a shaped article. This technique is described in more detail in EP-A-56703, 102158 and 102159.

A further procedure comprises forming incompletely cured composition into film by for example compression moulding, extrusion, melt-casting or belt-casting, laminating such films to fibrous reinforcing agent in the form of for example a non-woven mat of relatively short fibres, a woven cloth or essentially continuous fibre in conditions of temperature and pressure sufficient to cause the mixture to flow and impregnate the fibres and curing the resulting laminate.

Plies of impregnated fibrous reinforcing agent, especially as made by the procedure of one or more of EP-A 56703, 102158 and 102159, can be laminated together by heat and pressure, for example by compression moulding or by heated rollers, at a temperature above the curing temperature of the thermosetting resin or, if cure has already taken place, above the glass transition temperature of the mixture, conveniently at least 120° C. and typically about 180° C., and at a pressure in particular at least 0.1, preferably at least 5,MN/m$^2$.

The resulting multi-ply laminate may be anisotropic in which the fibres are oriented essentially parallel to one another or quasi-isotropic in each ply of which the fibres are oriented at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. There may be aggregates, as mentioned above in interlaminar regions.

Mouldings or laminates formed from a composition in which the polysulphone contains the repeating units I and II in essentially equimolar proportions and the reinforcing agent is essentially continuous carbon fibre show at a temperature up to 71° C. a deterioration of less than 30% in flexural modulus as measured at 23° C. Furthermore, although the polysulphone is amorphous, the composition has an environmental resistance superior to that of many other amorphous polymers. Thus after exposure to water at 71° C. for 14 days such a composition showed essentially unaffected tranverse flexural strength and short-beam shear strength (SBSS). Furthermore, after exposure to a hydraulic fluid at 70° C. for 14 days, a similar composition showed only a slight weight loss.

In the accompanying drawings:

FIG. 1(d) relates to the invention;

Reference to FIG. 1 has already been made and will be further made in reporting the experimental results below. The invention morphology shown in FIG. 1(d) appears to have two phases, each of which is continuous in at least one dimension, and which form an interpenetrating network morphology resulting from spinodal decomposition.

Figure 1A:
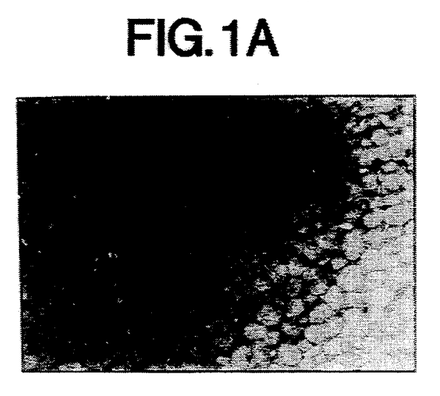
FIG. 1 shows transmission electron microscope (TEM) photographs of 4 possible morphologies of thermoplast/thermoset compositions.
Figure 1B:
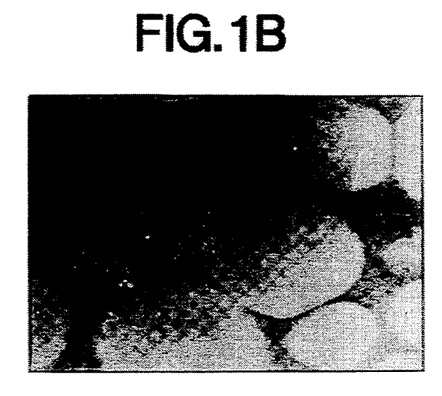
Figure 1C:
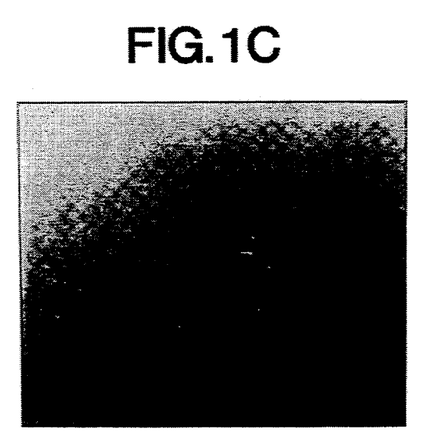
Figure 1D:
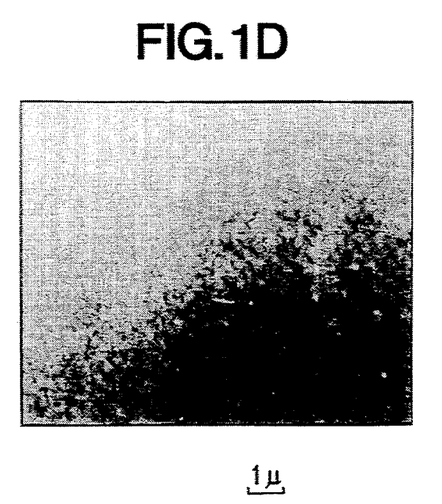
Figure 2A:
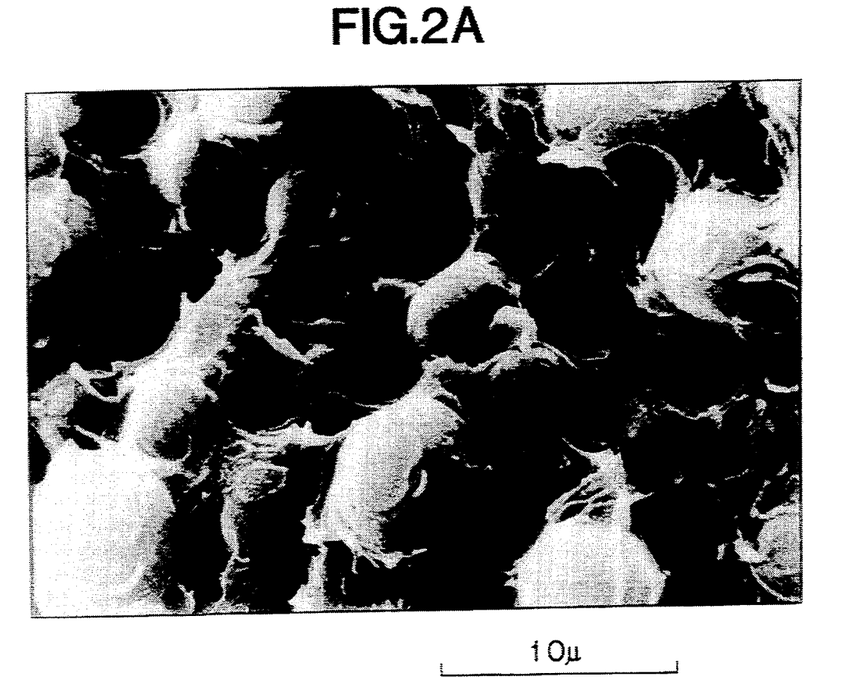
FIG. 2 shows SEM photographs of resin fracture surfaces for 2 morphologies.
Figure 2B:
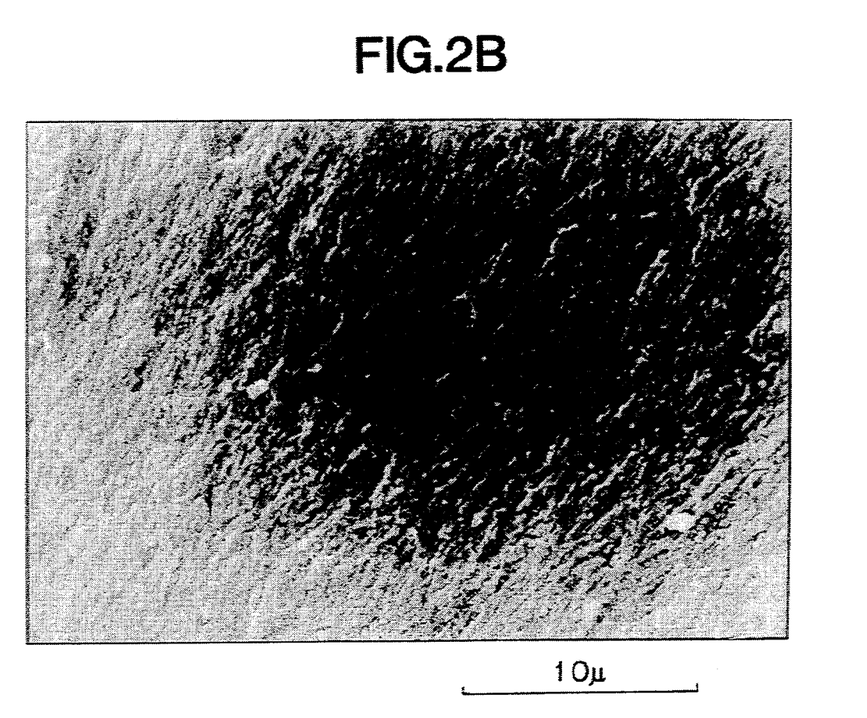

The fracture surfaces shown in FIG. 2 show clearly difference between a 2-phase composition (a) and the interpenetrating network of the invention (b). The two morphologies result in different micromechanisms of failure, the invention structure having greater toughness.

MECHANICAL PROPERTIES OF NON-COMPOSITE TEST PIECES

The properties of flexural modulus, compressive yield stress and resin fracture toughness, $G_{lc}$, were determined as follows: Flexural modulus was measured using a three point bend uniform beam specimen on an "Instron" model 1122 testing machine, at a cross-head speed of 5 mm/min, and is given by:

$$E = \frac{1}{4} \frac{F}{\gamma} \frac{L^3}{BW^3} \quad (1)$$

where F is the force required to cause central deflection;

$(F/\sigma)$ was evaluated at small deflection; $\sigma$ is less than W/2, W is the thickness, and B the breadth of the sample; and L is the separation of the supports. Typically L=0.05 m, B=0.01 m and W=0.003 m.

To characterise toughness, a three point bend, single edge-notched, linear elastic fracture mechanics test was used. The parameter $G_{lc}$, the critical value of the strain energy release rate in crack opening mode, is given by:

$$G_{lc} = U_c/BW \phi \quad (2)$$

where $\phi$ is a function of geometry and $U_c$, the energy absorbed, was obtained from instrumented impact measurements.

Sample test conditions followed one of three possibilities:
a Machine notch; temperature −65° C.; test speed 1 m s$^{-1}$.
b Machine pre-notch, then razor blade notch to produce a sharp natural pre-crack; temperature and speed as in a.
c Pre-notch and razor blade notch as in b; temperature 23° C.; test speed 1 mm min$^{-1}$ (that is, one sixty-thousandth of the speed in a and b).

An indication of the behaviour of a typical sample in the differing test conditions is given in Example 2(g) below.

The compressive yield stress $\sigma_y^c$, was measured on the "Instron" machine with cross-head speed of 0.5 mm/min, using samples of various dimensions.

Fracture mechanics specimens were retained and the fracture surfaces (see FIG. 2) prepared for evaluation by Scanning Electron Microscopy (SEM) on an Hitachi 520. Transmission Electron Microscopy (TEM) was performed using a Philips 301. TEM samples were prepared by ultra microtoming the resin using a diamond knife.

ENVIRONMENTAL STRESS CRACKING

For this test a test piece of dimensions: span 40 mm, thickness about 3 mm of the composition was mounted in a three-point bend jig, loaded at predetermined strain levels and immersed in methyl ethyl ketone for 16 h. Strain levels E were expressed by the equation $$E = \frac{6hY}{L^2}$$

where h is the beam thickness
Y is the vertical beam deflection
L is the span,
This equation is taken from British Standard BS 2782 Part 3, 1978.

MECHANICAL TESTING OF LAMINATES

For cured laminates, Compression After Impact (CAI), compressive strength and Short Beam Shear Strength (SBSS) were selected as the relevant parameters. CAI specimens were quasi-isotropic laminates, with a [+45,0,−45,90]$_{NS}$ lay-up, where N equalled four for 145 g/m² prepreg. Samples were loaded to failure in compression following a standard 66.9 Jcm$^{-1}$ (1500 in-lb/in) impact as outlined in Boeing Material Specification 82/76.

Composite compressive strength was obtained on [0]$_8$ ply laminate, in accordance with ASTM-D-695. SBSS was obtained on [0]$_{24}$ ply laminates in accordance with ASTM-D-2344. Hot/wet testing for both compressive strength and SBSS was carried out after conditioning at 74° C. in water for 14 days. The solvent resistance of laminates was assessed by testing SBSS, after a 14 day soak at room temperature in the relevant solvent.

EXAMPLE 1

A set of polyarylsulphones was synthesised by reacting together the appropriate aromatic dihalo-compounds and dihydric phenols exemplified by 4,4'-dichlorodiphenyl sulphone (DCDPS) (50 molar parts) with hydroquinone (10 to 40 molar parts) and 4,4'-dihydroxy diphenyl sulphone (40−10 molar parts) in presence of potassium carbonate optionally with sodium carbonate, and diphenyl sulphone (DPS) solvent at a temperature rising to 280° C. Some of these syntheses used excess dihydric phenol, some excess DCDPS and, of the latter, some were reacted further with various proportions of m-aminophenol to give amino end groups.

The polymers made are set out, with leading properties in Tables 1 and 2.

TABLE 1

| | PES:PEES Copolymers | | | |
|---|---|---|---|---|
| Polymer | PES/PEES mol ratio | End group; % of possible* | RV | Tg °C. |
| A | 60:40 | OH* | 0.22 | 213 |
| B | 40:60 | Cl 100 | 0.21 | 186 |
| C | 40:60 | OH* | 0.26 | 208 |
| D | 40:60 | NH$_2$ 35 | 0.27 | 198 |
| E | 40:60 | NH$_2$ 70 | 0.27 | 199 |
| F | 40:60 | NH$_2$ 100 | 0.27 | 201 |
| G | 40:60 | NH$_2$* | 0.30 | 195 |
| H | 40:60 | NH$_2$* | 0.35 | 206 |
| I | 40:60 | NH$_2$* | 0.25 | 201 |

TABLE 1-continued

| | PES:PEES Copolymers | | | |
|---|---|---|---|---|
| Polymer | PES/PEES mol ratio | End group; % of possible* | RV | Tg °C. |
| J | 20:80 | OH* | 0.38 | 198 |

*remainder of 100% is Cl in the case of OH or NH₂ end groups.

TABLE 2

| | | | Copolymers containing other units | | | | | |
|---|---|---|---|---|---|---|---|---|
| | (PhSO₂Ph)$_n$ | | | (Ph)$_a$ | | | | Tg |
| Polymer | n = | mol % | a = | link | position | mol % | RV | End Group % | °C. |
| L | 1 | 80 | 2 | CO | 4,4' | 20 | 0.21 | OH; | 179 |
| M | 1 | 70 | 2 | CO | 4,4' | 30 | 0.22 | OH; | 142 |
| N | 1 | 70 | 1 | — | 3 | 30 | 0.25 | NH₂; over 95 | 185 |
| O | 1 | 30 | 1 | — | 4 | 30 | 0.25 | NH₂; over 95 | 238 |
| | 2 | 40 | — | — | — | — | — | — | |
| P | 1 | 50 | 1 | — | 4 | 30 | 0.24 | NH₂; over 95 | 222 |
| | 2 | 20 | — | — | — | — | — | — | |
| Q | 1 | 41.5 | 1 | — | 4 | 30 | 0.24 | NH₂ | |
| | 2 | 28.5 | — | — | — | — | | | |

EXAMPLE 2

Each of the polymers in Table 1 was formulated with one of the thermoset resins set out in Table 3. (The manufacturer's code names are as identified hereinbefore.

TABLE 3

Precursors of thermoset

| Formulation | MY 721 | MY 0510 | DEN 431 | XPY 306 | MDAB ++ | Hardener + |
|---|---|---|---|---|---|---|
| A | — | 36.1 | 34.3 | — | — | 29.6 |
| B | — | 65.2 | — | — | — | 34.8 |
| C | — | 36.9 | — | 32.9 | — | 30.1 |
| D | — | 35.4 | — | 36.9* | — | 27.2 |
| E | 52.1 | 15.1 | — | — | — | 32.8 |
| F | 68.0 | — | — | — | — | 32.0 |
| G | 54.4 | — | — | — | 20 | 25.6 |
| H | — | 32.3 | — | 32.3 | — | 35.4 |

*as the equivalent product known as XB3336
+ 3,3'-diaminodiphenylsulphone (except Example 2f)
++ MDAB is 4,4'-bismaleimido diphenylmethane.

The procedure was as follows:

The thermoplast was dissolved in a 95:5 v/v methylene chloride/methanol mixture, to about 10% by weight. This solution was then added with stirring to the epoxy resin formulation without hardener. Once a homogeneous mixture was obtained, the correct weight of hardener was added. The resulting mixture was heated to boil off the solvent until the mixture contained 80% w/w solids. The mixture was poured into an 15×10 cm open mould and left at 145° C. under vacuum for 30 mins. The vacuum was released, and the oven heated at 2° C./min to 180° C. at which the sample cured for 2 h.

(a) Effect of Thermoplast Unit Composition

A set of compositions was made containing 70% (dry solids) weight percent of epoxy formulation A or C and 30 weight percent of various polyarylethersulphones. The results of the above mentioned tests (using conditions a for $G_{ic}$) are set out in Table 4. It is evident that there is a significant increase in fracture toughness $G_{IC}$, the best result being obtained using 40:60 PES:PEES polymer.

TABLE 4

| | Thermoplast | | | | | | | | |
|---|---|---|---|---|---|---|---|---|---|
| Epoxy | PES/PEES mol ratio | RV | End Group | SO₂ percent | MORPH ** | FLEX MOD (GPa) | $\sigma_y{}^c$ (MPa) | $G_{1C}$ (kJm$^{-2}$) | $K_{1C}$ (Mnm$^{-1.5}$) |
| A | — | — | — | — | — | 3.67 | 185 | 0.38 | 0.84 |
| A | 100:0 | 0.26 | —OH | 27.7 | c | 3.22 | 171 | 0.59 | 0.98 |
| A | 60:40 | 0.22 | —OH | 25.2 | | 3.25 | 174 | 0.45 | 0.83 |
| A | 40:60 | 0.26 | —OH | 23.67 | d | 3.25 | 169 | 1.02 | 1.56 |
| A | $^I$UDEL | 0.24 | —OH | 14.5 | a | 3.26 | 136 | 0.87 | 1.35 |
| A | $^I$UDEL | 0.28 | —Cl | 14.5 | a | 3.14 | 128 | 0.39 | 0.83 |
| A | 100:00 | 0.50 | —OH | 27.7 | c | 3.75 | 187 | 0.41 | 0.9 |
| A | 40:60 | 0.30 | —NH₂ | 23.67 | d | 3.69 | 182 | 1.06 | 1.73 |
| C | 100:0 | 0.26 | —OH | 27.7 | c | 3.49 | 150 | 0.41 | 0.96 |
| C | 40:60 | 0.35 | —NH₂ | 23.67 | d | 3.56 | 162 | 0.83 | 1.42 |
| C | 40:60 | 0.25 | —NH₂ | 23.67 | d | 3.50 | 165 | 0.64 | 1.19 |
| C | 20:80 | 0.38 | —OH | 21.9 | d | 3.45 | 151 | 0.81 | 1.45 |
| C | $^I$UDEL | 0.20 | —NH | 14.5 | a | 3.49 | 138 | 0.50 | 1.06 |
| C | — | — | — | — | — | 3.97 | 194 | 0.26 | 0.60 |

$^I$UDEL is a polymer of relatively low molecular weight consisting of ether-linked units PhSO₂Ph and Ph C(CH₃)₂ Ph (where Ph is paraphenylene) and having end groups as shown.
**a, b, c or d from FIG. 1.

Figure 3A:
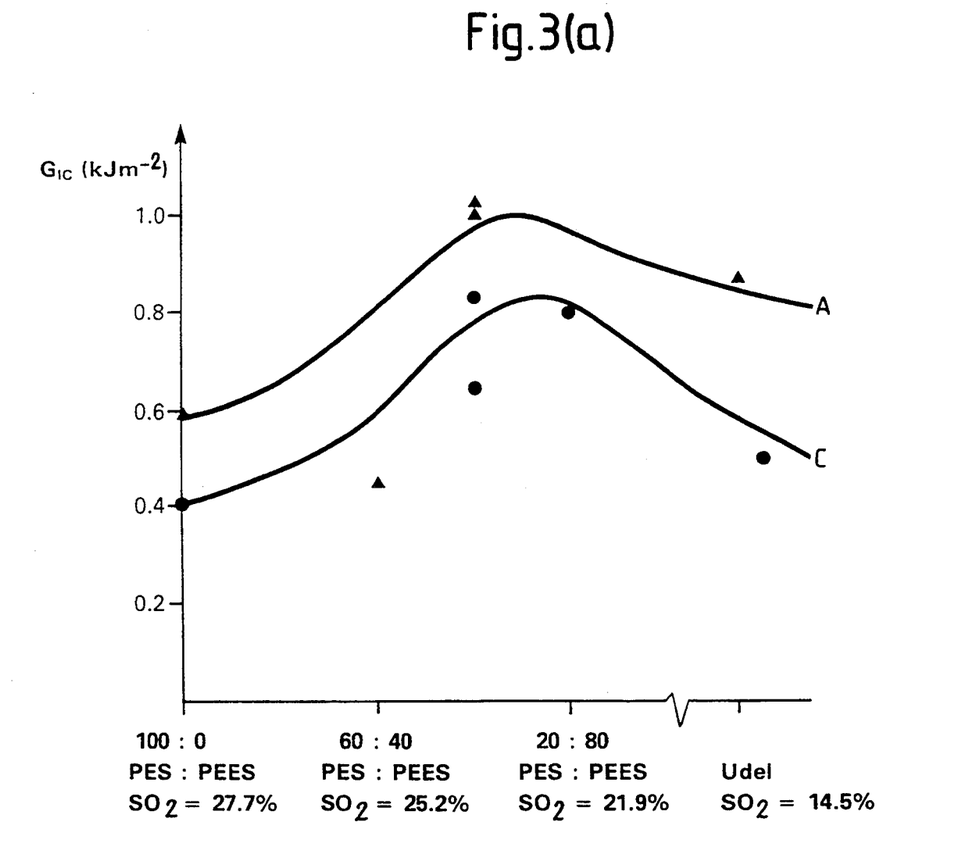
FIGS. 3(a), 3(b) are graphs of the data in Table 4 below showing the dependence of fracture energy $G_{lc}$ and critical stress intensity factor $K_{lc}$ on the ratio of units I and II in the thermoplast component of the composition.
Figure 3B:
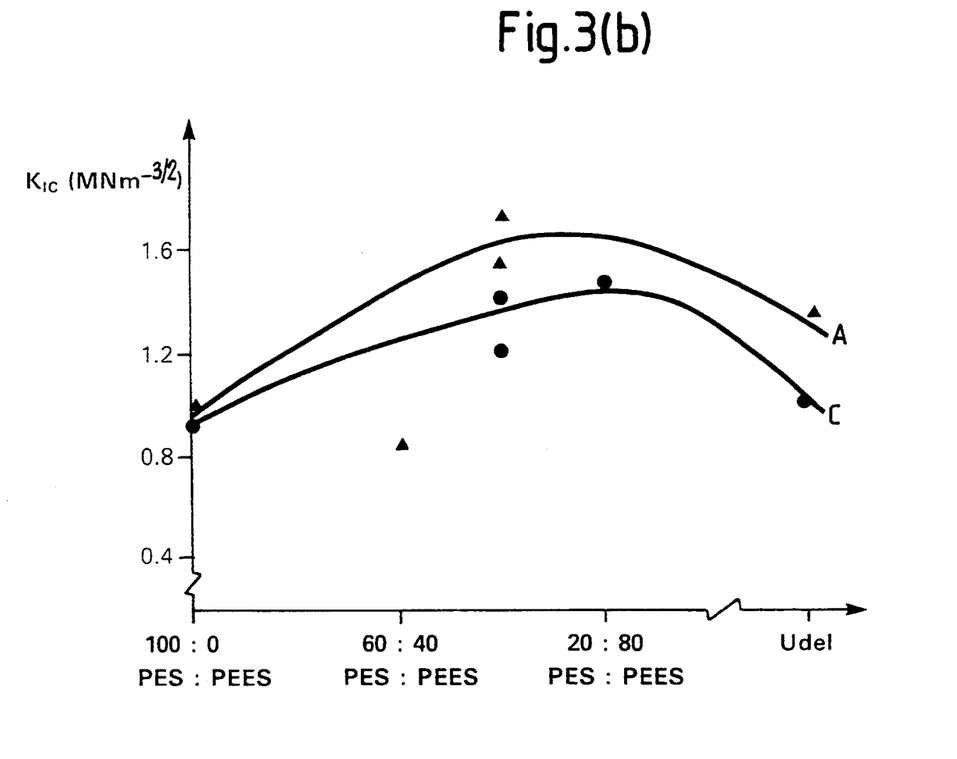

From these data as represented in FIGS. 3(a) and 3(b) it is evident that especially favourable values of $G_{IC}$ and $K_{IC}$ are obtained when the SO₂ content of the thermoplast is in the range 23 to 25%. This is the range in which co-continuous morphology resulting from spinodal decomposition occurs most readily. At higher SO₂ contents the morphology tends towards homogeneity as in FIG. 1(c). At SO₂ contents below 20% the islands-in-sea system increasingly occurs and is subject to fracture as in FIG. 2(a).

(b) Effect of Thermoplast Concentration

A set of compositions was made containing epoxy formulation A and various concentrations of the 40:60 PES/PEES polymer of RV 0.26. The results of the above-mentioned tests are shown in Table 5.

TABLE 5

| Thermoplast % w/w | Flex Mod GPa | $\sigma^c y$ MPa | $G_{1C}$ kJm$^{-2}$ |
| --- | --- | --- | --- |
| 0 | 3.9 | 202 | 0.40 |
| 10 | 3.77 | 208 | 0.76 |
| 15 | 3.65 | 195 | 0.84 |
| 20 | 3.66 | 187 | 1.00 |
| 25 | 3.57 | 190 | 1.00 |
| 30 | 3.38 | 180 | 1.17 |
| 35 | 3.53 | 179 | 1.33 |
| 40 | 3.43 | 175 | 1.52 |

The improvement in fracture toughness is especially significant using more than 15% of the thermoplast. The loss in modulus would be unimportant in many applications.

(c) Effect of Thermoplast Molecular Weight

The data for 40:60 polymer with formulation C epoxy (see Table 3) show that an increase in molecular weight increases toughness without significantly affecting flexural modulus.

In a set of runs using 40:60 polymer samples differing in molecular weight but all having $NH_2$ end groups, blended with epoxy resin formulation D in the total solids weight ratio 35 polymer to 65 resin, the comparative data shown in Table 6 were obtained in test conditions C.

TABLE 6

| Polymer | | Flex Mod GPa | $\sigma^c y$ MPa | $G_{1c}$ kJm$^{-2}$ | $G_{1c}$ error |
| --- | --- | --- | --- | --- | --- |
| RV | Approx MW | | | | |
| 0.16 | 5500 | 3.46 | 165 | 0.72 | ±0.44 |
| 0.24 | 12500 | 3.63 | 163 | 0.87 | ±0.05 |
| 0.38 | 17000 | 3.96 | 164 | 1.12 | ±0.37 |
| 0.43 | 19500 | 3.79 | 166 | 1.23 | ±0.10 |

The advantage of molecular weight over 10000 is evident.

(d) Effect of Different Epoxy Resins

A set of compositions was made containing 70% (dry solids) weight of each of formulations A, B and C, along with 30 weight percent of amine-ended 40:60 polymer of RV 0.3. Test results (conditions a) in comparison with thermoplast-free epoxy are shown in Table 7.

TABLE 7

| Epoxy | Thermoplast % w/w | Flex Mod G Pa | $\sigma^c y$ MPa | $G_{1C}$ kJm$^{-2}$ |
| --- | --- | --- | --- | --- |
| A | 0 | 3.9 | 202 | 0.38 |
|   | 30 | 3.69 | 182 | 1.00 |
| B | 0 | 4.38 | 192 | 0.21 |
|   | 30 | 4.00 | 161 | 0.55 |
| C | 0 | 3.97 | 194 | 0.26 |
|   | 30 | 3.53 | 164 | 0.73 |

The improvement in fracture toughness is very substantial.

e) Effect of Hardener Concentration

A set of compositions was made containing 70% dry solids weight of variants of epoxy formulation A differing in hardener concentration, along with 30 weight percent of amine-ended 40:60 polymer of RV 0.25. Of these epoxy formulations the 80% stoichiometric is the same as that shown in Table 3. (For stoichiometric calculation the polymer amine groups are not counted). Test results (conditions a) are shown in Table 8.

TABLE 8

| Hardener % of stoichiometric | Flex Mod GPa | $\sigma y^c$ MPa | $G_{1C}$ kJm$^{-2}$ |
| --- | --- | --- | --- |
| 60 | 3.6 | 179 | 0.75 |
| 70 | 3.49 | 185 | 1.10 |
| 80 | 3.50 | 180 | 1.17 |
| 90 | 3.53 | 182 | 1.01 |
| 100 | 3.32 | 175 | 1.52 |

(f) Effect of Hardener Type

The run in Example 2c using the 0.24 RV polymer was repeated with the exception that 4,4'-diaminodiphenylsulphone was used as hardener. $G_{lc}$ was substantially the same at 0.88 kJm$^{-2}$.

(g) Effect of Test Conditions

The sample in Example 2c using RV 0.24 polymer was also tested in conditions a and b and gave these results for $G_{ic}$ (kJm$^{-2}$): a 1.17; b 0.51; c 0.87.

(h) Effect of Polymer End Groups

A set of 4 samples was prepared each using 35% w/w of one of the polymers set out in Table 1 above with epoxy formulation D and tested in conditions C for toughness. Results are shown in Table 9.

TABLE 9

| End group molar ratio* | | Polymer RV | Flex Mod GPa | $\sigma y^c$ MPa | $G_{1c}$ kJm$^{-2}$ |
| --- | --- | --- | --- | --- | --- |
| Cl | NH$_2$ | | | | |
| 100 (100) | 0 (0) | 0.21 | 3.20 | NA | 0.02 |
| 65 (74) | 35 (26) | 0.27 | 3.17 | 160 | 0.08 |
| 30 (43) | 70 (57) | 0.27 | 3.26 | 164 | 0.69 |
| 0 (4) | 100 (96) | 0.27 | 3.16 | 169 | 0.92 |

*First numbers based on quantities of polymer synthesis reactants; numbers in parenthesis were measured by NMR.

It is evident that the composition is usable only for conditions not subject to fracture unless the amine content is substantially over 25%.

(i) Environmental Stress Cracking Resistance

Further samples as in Example 1(h) were tested as described above. Results are shown in Table 10.

TABLE 10

| End group molar ratio (design) | | Polymer RV | E | Result |
| --- | --- | --- | --- | --- |
| Cl | NH$_2$ | | | |
| 100 | 0 | 0.21 | 0.25 | Severe damage |
| 65 | 35 | 0.27 | 0.25 | Fractured in half |
| 65 | 35 | 0.27 | 0.5 | Fractured in half |
| 30 | 70 | 0.27 | 0.25 | No cracking |
| 0 | 100 | 0.27 | 0.25 | No cracking |
| 0 | 100 | 0.27 | 0.5 | No cracking |

It is evident that the composition is usable only for conditions not subject to organic liquids such as MEK unless the amine end group content is substantially over 35%.

EXAMPLE 3

A solution containing epoxy formulation C (Table 2) and (on total solids) 35% w/w of thermoplast of 40:60 PES:PEES ratio, RV 0.26 and —NH$_2$ ends, in 90:10 v/v methylene chloride/methanol mixture at 55% w/w solids content was made by dissolving the hardener and the epoxy components, then adding, with stirring, a solution of the thermoplast in methylene chloride/methanol mixture. It was then heated to remove excess solvent and obtain a clear solution.

Unsized continuous collimated carbon fibres (grade 12K, AS4, Hercules Inc) were impregnated with this solution and the solvent evaporated to produce prepreg tape of areal weight 145 g per m$^2$, resin content 36% w/w and less than 1% w/w volatiles. The prepreg showed an acceptable level of tack and drape. The prepreg was moulded in an autoclave into panels with lay-up [0]$_8$, [0]$_{24}$ and [−45/0/+45/90]$_{4s}$ using a standard vacuum bag technique and the following cure cycle:

heat to 180° C. at 2° C./min at a pressure 176 mm absolute hold 2 h at 180° C. under 4.4 atm abs whilst venting vacuum bag;

hold at 180° C. for 2 hr;

cool to room temperature at 2° C./min.

The results of the mechanical tests carried out on the resulting laminates are shown in Table 11.

TABLE 11

| Compressive Strength (MPa) | |
| --- | --- |
| Room temp | 1531 |
| 82° C. | 1345 |
| 82° C. (Wet) | 1186 |
| SBSS (MPa) | |
| Room temp | 107.6 |
| 82° C. | 86.2 |
| 82° C. (Wet) | 66.2 |
| Acetone Soak | 109.0 |
| MEK Soak | 108.2 |
| CAI (66.9 Jcm$^{-1}$ Impact), (MPa) | 290 |

These results show that the composite has superior compression after impact characteristic of a tough composite system and a 0° compressive strength which maintains a high value even at elevated temperature and hot-wet conditions. The composite also has a high short beam shear strength which is unaffected by exposure to ketone based solvents.

EXAMPLE 4

Further Comparison of Differing Thermoplast Concentrations

A set of compositions was prepared by the procedure of Example 2 using the 40:60 PES:PEES amine ended polymer of RV 0.24 and epoxy formulation E described above. As a preliminary a sample of epoxy formulation E without thermoplast was cured and subjected to glass transition temperature (Tg) measurement in a Polymer Labs Dynamic Mechanical Analyser operated at 10 KHz, in comparison with a cured sample of epoxy formulation D. The Tg values were in °C.:

D 182

E 240 and thus represent the higher use temperature of component MY 721 as intended by its manufacturer.

The properties of the compositions are shown in Table 12 (toughness test B).

TABLE 12

| Polymer % w/w | Flex Mod GPa | $\sigma y^c$ Mpa | $G_{1c}$ kJm$^{-2}$ |
| --- | --- | --- | --- |
| 0 | 4.32 | 230.6 | 0.12 |
| 10 | 4.12 | 213.5 | 0.23 |
| 15 | 3.95 | 208.0 | 0.24 |
| 20 | 3.95 | 200.3 | 0.28 |
| 25 | 4.02 | 199.1 | 0.29 |
| 30 | 3.98 | 189.1 | 0.37 |

Thus a significant improvement in fracture toughness $G_{lc}$ results from the presence of the polymer without serious loss in flexural modulus.

EXAMPLE 5

Use of Bis Maleimide (BMI) as Part of Thermoset Component

Using the procedure of Example 2 thermoset formulations F and G (see Table 3) were blended with the PES:PEES 40:60 70% amine ended polyarylsulphone (20% w/w on total solids of composition), cast into test samples and cured and tested. They were then tested using conditions C for $G_{lc}$. Results are shown in Table 13.

TABLE 13

| Thermoset Formulation | Polyarylsulphone % w/w | Flex Mod GPa | $\sigma y^c$ MP | $G_{lc}$ kJm$^{-2}$ |
| --- | --- | --- | --- | --- |
| F (no BMI) | 0 | 3.97 | 227.5 | 0.07 |
| F (no BMI) | 20 | 3.74 | 196.2 | 0.24 |
| G (with BMI) | 0 | 3.90 | 225.0 | 0.08 |
| G (with BMI) | 20 | 3.62 | 198.0 | 0.17 |

It is evident that part of the thermoset can be provided by BMI resin and that the polyarylsulphone again improves fracture toughness.

EXAMPLE 6

Effect of Other Polyarylsulphones in Toughening Epoxy Resins

Using the procedure of Example 2 compositions were prepared by blending polymers L-Q (Table 2) and the PES:PEES 40:60 70% amine-ended polymer, each of these at 35% w/w, with epoxy formulation B or D (Table 3), cast into test samples and cured. They were then tested, using conditions C for $G_{lc}$. Results are shown in Table 14.

TABLE 14

| Thermoset Formulation | Polyarylsulphone % w/w | Flex Mod GPa | $\sigma y^c$ MPa | $G_{1c}$ kJm$^{-2}$ |
| --- | --- | --- | --- | --- |
| D | none | 3.88 | 192 | 0.17 |
| D | L | 3.98 | 168 | 0.59 |
| D | M | 4.08 | 165 | 1.12 |
| D | N | 3.36 | 174 | 0.82 |
| B | N | 3.41 | 183 | 0.54 |
| D | O | 3.77 | 164 | 0.42 |
| D | P | 3.90 | 178 | 0.55 |
| D | Q | 3.88 | 172 | 1.10 |
| D | PES:PEES | 3.63 | 163 | 0.87 |

EXAMPLE 7

A solution containing epoxy formulation H (Table 3) and (on total solids) 35% w/w of polyarylsulphone of 40:60 PES:PEES ratio, RV 0.26 and —NH$_2$ ends, in methylene chloride at 55% w/w solids content was made by melt-mixing the two epoxy resin precursors at 50°–80° C., adding, with stirring, a solution of the polyarylsulphone in methylene chloride. It was heated at 80°–120° C. to remove excess solvent and obtain a clear solution. The hardener was then added and stirred in until uniformly distributed. The resulting viscous liquid mixture was cooled and stored at 0° C. until required for use.

Unsized continuous collimated carbon fibres (grade 12K, AS4 Hercules Inc) were impregnated with this solution and the solvent evaporated to produce prepreg tape of resin content 36% w/w and less than 1% w/w volatiles. The prepreg showed an acceptable level of tack and drape. The prepreg was moulded in an autoclave into panels with lay-up [0]$_8$, 0]$_{16}$ and [−45/0/+45/90]$_{xs}$ (x=2 or 3 depending on prepreg areal weight) using a standard vacuum bag technique and the following cure cycle:

heat to 180° C. at 1° C./min at a pressure 176 mm absolute hold 2 h at 180° C. under 5.8 atm abs whilst venting vacuum bag;

hold at 180° C. for 2 hr;

cool to room temperature at less than 3° C./min.

The results of the tests carried out on the resulting laminates are shown in Table 15.

TABLE 15

Morphology: co-continuous as from spinodal decomposition.

| 20° C. | 232 ksi (1600 MPa) |
|---|---|
| 82° C. | 217 (1497 MPa) |
| 82° C. (Wet) | 174 (1200 MPa) |

CAI 53.0 ksi (365 MPa)

Tensile strength 0° C. 453±12 ksi; 3124±83 MPa

Tensile Modulus 25.7 Msi; 173.6 GPa

Tensile Strain 1.7%

These results show again a tough composite system with compressive strength at a high value even at elevated temperature and hot-wet conditions, and with high short beam shear strength unaffected by exposure to ketone solvents.

A sample of the liquid mixture subjected to the same cure cycle was found to have Tg 181° C.

EXAMPLE 8

(Old 977: 58715; 87–8050 and 8051)

Example 7 was repeated using the same polyarylsulphone but with epoxy formulation D (Table 3) and using unsized IM 7 grade, ex Hercules.

Test results are shown in Table 16.

TABLE 16

| Morphology co-continuous as from spinodal decompostion. | | |
|---|---|---|
| | ksi | MPa |
| Compressive strength | | |
| 25° C. | 216 ± 14 | 1490 ± 97 |
| 82° C. | 182 ± 13 | 1255 ± 90 |
| 82° C. (wet) | 165 ± 6 | 1138 ± 41 |
| SBSS | | |
| Room temp (dry) | 18.0 ± 0.7 | 124.2 ± 4.8 |
| * (MEK) | 17.8 ± 0.2 | 122.8 ± 1.4 |
| 82° C. (MEK) | 14.3 ± 0.2 | 98.6 ± 1.4 |
| CAI | 50.4 ± 2.1 | 347.7 ± 14.5 |
| Tensile strength at room temp | 402 ± 33 | 2772 ± 227 |
| Tensile Modulus (25° C.) | 392 ± 21 | 2701 ± 145 |
| Strain % (25° C.) 1.71 | — | — |

*"(MEK)" denotes that the sample was immersed in methyl ethyl ketone for 2 weeks.

EXAMPLE 9

Toughening of Phenol-formaldehyde Resin

At room temperature a phenol-formaldehyde precondensate (Novolak SFP 118 ex Schenectady Chemical Inc) (102 parts) was mixed in 90:10 v/v methylene chloride:methanol with hexamethylene tetramine (18 parts) and one of the following polyarylsulphones (30 parts):

A. Ether-linked PhSO$_2$Ph 50 mole % PhSO$_2$PhPhSO$_2$Ph 50 mole % End groups chlorine; Ph is paraphenylene; RV=0.43

B. Ether-linked Ph SO$_2$Ph; Ph is paraphenylene End groups over 95% NH$_2$; RV=0.26

C. 25 mole % PES: 75 mole % PEES end groups over 95% NH$_2$; RV=0.22.

These mixtures were boiled down and cast into test plaques, along with D, a control containing no polyarylsulphone and cured. It was noted that plaques A, B and C showed co-continuous morphology. Plaques A-D were subjected to mechanical tests as described hereinbefore. Results are shown in Table 17.

TABLE 17

| Sample | Flex Mod GPa | $\sigma y^c$ MPa | $K_{1c}$ MNm$^{1.5}$ | $G_{1c}$ kJm$^{-2}$ |
|---|---|---|---|---|
| A | 5.54 | 261.75 | 1.43 | 0.61 |
| B | 5.64 | 281.0 | 1.15 | 0.46 |
| C | 5.05 | 273.5 | 2.06 | 0.87 |
| D | 5.70 | 286 | 0.53 | 0.15 |

EXAMPLE 10

Toughening of Bis-maleimide Resin (a) The following ingredients were dissolved in sufficient of a 90:10 v/v methylene chloride/methanol mixture to give a 10% w/w solution:

| polymer Q (Table 2) | 20 parts |
|---|---|
| 3,3'-bismaleimidodiphenylsulphone | 48 parts |
| 2,2'-diallylbisphenol A | 32 parts |
| hydroquinone | 2 parts |

The solvent was evaporated under vacuum, giving a viscous suspension. A sample of the suspension was run into a 15×10 cm open shallow mould and heated at low pressure (0.1 mm) at 170° C. for 1.5 h. The pressure was allowed to rise to atmospheric and a preheated lid was applied to the mould. The mould and its contents were heated at 2° C. per min to 190° C., held at 190° C. for 4 h, then allowed to cool slowly to room temperature. The casting was de-moulded and post-cured by heating at 2° C. per min to 240° C., holding at 240° C. for 6 h, then cooling slowly to room temperature.

The casting was examined by TEM and SEM and found to exhibit a co-continuous morphology typical of spinodal decomposition of a preceding substantially homogeneous mixture.

Mechanical testing of the casting gave these results:

| Flex Mod | 4.44 GPa |
|---|---|
| $\sigma y^c$ | 225 MPa |
| Tg | 240° C. |

(b) Run (a) was repeated using 36 parts of the stated BMI ingredient and 12 parts of 4,4'-bis-3-maleimidophenoxy diphenylsulphone.

The morphology of the cured composition was essentially identical with that of 1a.

Mechanical testing gave these results:

| Flex Mod | 4.11 GPa |
|---|---|
| $\sigma y^c$ | 213 MPa |
| $K_{1c}$ | 1.34 MNm$^{-1.5}$ |
| $G_{1c}$ | 0.50 kJm$^{-2}$ |

We claim:

1. A polymer composition comprising a thermoset resin precursor component and a polyarylsulphone component, said thermoset resin precursor component being selected from the group consisting of precursors of:
   a) a cyanate resin;
   b) an isocyanate resin; and
   c) mixtures of a) and b);
   said thermoset resin precursor component optionally also containing precursors selected from the group consisting of;
   d) an epoxy resin;
   e) a bismaleimide resin; and
   f) a phenol-formaldehyde resin;
   said composition being characterized in that, on curing of said thermoset resin precursor component, each of such components are present at least partly as a continuous interpenetrating network in at least one dimension and in which one phase forms a net in 2 or 3 dimensions and another phase fills the interstices between the threads of the net.

2. A composition according to claim 1 in which each phase has a minimum dimension in the range 0.01 to 10 microns and a maximum dimension at least 10% of the geometric dimension of the mass of the composition.

3. A composition according to claim 1 in which the two phases are the product of spinodal decomposition of an initially substantially homogeneous liquid mixture containing said polyarylsulphone component and thermoset resin precursor component.

4. A composition according to claim 1 characterised by chemical bonds bridging the interface between the two phases.

5. A composition according to claim 1 in which said polyarylsulphone component comprises at least one polyarylsulphone containing, linked through ether and-/or thioether, the repeating units (PhSO$_2$Ph)$_n$ where Ph is phenylene, n=1 to 2 and can be fractional.

6. A composition according to claim 5 in which, in the polyarylsulphone, n is in the range 1.3 to 1.5.

7. A composition according to claim 1 in which said polyarylsulphone component comprises at least one polyarylsulphone containing, linked through ether and-/or thioether, the repeating units (PhSO$_2$Ph)$_n$ and (Ph)$_a$ where Ph is phenylene, n=1 to 2 and can be fractional and a is 1 to 3 and can be fractional and (when a exceeds 1) such phenylenes are linked linearly through a single chemical bond or —CO—.

8. A composition according to claim 7 in which the polyarylsulphone has a weight percent SO$_2$ content, defined as 100 times (weight of SO$_2$)/(weight of average repeating unit), in the range 23 to 25.

9. A composition according to claim 1 in which the polyarylsulphone has a number average molecular weight in the range 2000 to 60000.

10. A composition according to claim 1 in which the polyarylsulphone has a number average molecular weight in the range 9000 to 25000.

11. A composition according to claim 1 wherein said polyarylsulphone component comprises at least one amine end group carrying polyarylsulphone.

12. A composition according to claim 11 in which at least 70 mol percent of the end groups of the polyarylsulphone are NH$_2$.

13. A composition according to claim 1 in which the weight proportion of said polyarylsulphone component is in the range 20–50 percent, calculated on non-volatile constituents after curing the thermoset resin precursor at up to 200 deg C.

14. A composition according to claim 1 in which the thermoset resin precursor component comprises at least one epoxy resin precursor and there is present at least one amine curing agent having a molecular weight of up to 500 per amino group.

15. A composition according to claim 1 in which the thermoset resin precursor comprises at least one epoxy resin selected from the group consisting of glycidyl derivatives of diaminodiphenylmethane, aminophenol, bisphenol-A, bisphenol-F and novolak.

16. A composition according to claim 1 in which the thermoset component comprises a bismaleimide resin precursor of the general formula:

$$\left[ \begin{array}{c} CO \\ \diagdown \\ N \\ \diagup \\ CO \end{array} \!\!\!-\!\!\! \left( \!\!\!\bigcirc\!\!\! \right)\!\!-\!\!A\!\!-\!\!\left( \!\!\!\bigcirc\!\!\! \right)_m \!\!\!-\!\!\! \begin{array}{c} CO \\ \diagup \\ N \\ \diagdown \\ CO \end{array} \right]$$

in which m is 1 to 4, A is a direct link, oxygen, —SO$_2$—, —CO— or a divalent hydrocarbon radical and at least one of group A is SO$_2$.

17. A composition according to claim i in the form of a prepreg or laminate containing continuous reinforcing fibre.

18. A polymer composition comprising a thermoset resin precursor component, a polyarylsulphone component and a fibrous filler said thermoset resin precursor component being selected from the group consisting of precursors of:
   a) a cyanate resin;
   b) an isocyanate resin; and
   c) mixtures of a) and b);
   said thermoset resin precursor component optionally also containing precursors selected from the group consisting of;
   d) an epoxy resin;
   e) a bismaleimide resin; and
   f) a phenol-formaldehyde resin
   said composition being characterized in that, on curing of said thermoset resin precursor component, each of such components are present at least partly as a continuous interpenetrating network in at least one dimension.

19. A polymer composition comprising a thermoset resin component and a polyarylsulphone component, each of such components being present at least partly as a continuous interpenetrating network in at least one dimension, wherein:
   a) said thermoset resin component comprises at least one member selected from the group consisting of cyanate resins and isocyanate resins and mixtures thereof and, optionally, of epoxy resins, bis-maleimide resins and phenol-formaldehyde resins; and
b) said polyarylsulphone component comprises at least one polyarylsulphone comprising ether-linked repeating units selected from the group consisting of:

—$(PhSO_2Ph)_n$— and

—$(Ph)_a$— wherein:
Ph is phenylene
$n=1$ to 2 and can be fractional;
$a=1$ to 3 and can be fractional; and
in —$(Ph)_a$—, when a exceeds 1, said phenylenes are linked through a single chemical bond or —CO—; provided that the repeating unit —$(PhSO_2Ph)_n$— is always present in said at least one polyarylsulphone.

20. A polymer composition comprising a thermoset resin component and a polyarylsulphone component, each of such components being present at least partly as a continuous interpenetrating network in at least one dimension, wherein:
a) said thermoset resin component comprises at least one member selected from the group consisting of cyanate resins and isocyanate resins and mixtures thereof, and, optionally, of epoxy resins, bis-maleimide resins and phenol-formaldehyde resins; and
b) said polyarylsulphone component comprises at least one polyarylsulphone consisting essentially of ether-linked repeating units selected from the group consisting of:

—$(PhSO_2Ph)_n$— and

—$(Ph)_a$— wherein:
Ph is phenylene
$n=1$ to 2 and can be fractional;
$a=1$ to 3 and can be fractional; and
in —$(Ph)_a$—, when a exceeds 1, said phenylene are linked through a single chemical bond or —CO—; provided that the repeating unit —$(PhSO_2Ph)_n$— is always present in said at least one polyarylsulphone and that the relative proportions of the repeating units are such that on average at least two units —$(PhSO_2Ph)_n$— are in sequence in each polymer chain present, said at least one polyarylsulphone having amine end groups and having a number average molecular weight in the range 2000 to 60000.

21. A composition according to claim 20 in which, when said repeating units —$(Ph)_a$— are present in said at least one polyarylsulphone, $a=1$ to 2 and can be fractional and, when a exceeds 1, said phenylenes are linked through a single chemical bond.

22. A polymer composition comprising a thermoset resin component and a polyarylsulphone component, each of such components being present at least partly as a continuous interpenetrating network in at least one dimension, wherein:
a) said thermoset resin component comprises at least one member selected from the group consisting of cyanate resins and isocyanate resins and mixtures thereof, and, optionally, of epoxy resins, bis-maleimide resins and phenol-formaldehyde resins; and
b) said polyarylsulphone component comprises at least one polyarylsulphone consisting essentially of ether-linked repeating units of formula:

—$(PhSO_2Ph)_n$— and

—$(Ph)_a$— wherein:
Ph is phenylene
$n=1$ to 2 and can be fractional;
$a=1$ to 2 and can be fractional; and
in —$(Ph)_a$—, when a exceeds 1, said phenylenes are linked through a single chemical bond; provided that the relative proportions of the repeating units are such that at on average at least two units —$(PhSO_2Ph)_n$— are in sequence in each polymer chain present, said at least one polyarylsulphone having end groups of formula

—A′—Y wherein;
A′ is a divalent hydrocarbon group and
Y is a group providing active hydrogen; and having a number average molecular weight in the range 2000 to 60000.

* * * * *